United States Patent [19]

Kato

[11] 4,372,529
[45] Feb. 8, 1983

[54] PLASTIC VALVE HAVING A CAP NUT COUPLER

[75] Inventor: Shigenobu Kato, Asaka, Japan

[73] Assignee: Sekisui Kagaku Kogyo Kabushiki Kaisha, Osaka, Japan

[21] Appl. No.: 247,503

[22] Filed: Mar. 25, 1981

[30] Foreign Application Priority Data

Mar. 31, 1980 [JP] Japan .............................. 55-43330[U]

[51] Int. Cl.³ ........................ F16L 37/28; F16L 25/00
[52] U.S. Cl. .................................... 251/151; 285/388
[58] Field of Search ................ 251/148, 151; 285/388

[56] References Cited

U.S. PATENT DOCUMENTS 1,675,808  7/1928  Kliss .................................... 285/388
4,007,953  2/1977  Powell ............................ 285/388 X
4,103,865  8/1978  Nanba et al. ......................... 251/148

FOREIGN PATENT DOCUMENTS 992097  7/1951  France .................................. 285/388
755118  8/1956  United Kingdom .................. 285/388

Primary Examiner—A. Michael Chambers
Attorney, Agent, or Firm—Wenderoth, Lind & Ponack

[57] ABSTRACT

A synthetic resin valve in which a body is connected end-to-end in abutting relationship to a cylindrical body cap having a flange at one end and a seat at the other end by screwing the two together with a cap nut. The seat includes a ring-like element having a lesser diameter portion which is fitted into an annular groove adjacent to a front end portion of the body cap, and a greater diameter portion which engages the outer peripheral surface of the front end portion of the body cap, the front face of the larger diameter portion of the ring-like element preferably resting in the same plane as the front face of the body cap which abuts the body. The ring-like element is cut radially in one circumferential region so that it may be deformed around the body cap such that its smaller diameter region may be fitted into the annular groove, and has a rear wall for engaging the cap nut. This structure permits the seat to be formed after the cap nut has been provided around the body cap with the flange previously integrally connected to the remaining cylindrical portion of the body cap.

6 Claims, 4 Drawing Figures

PLASTIC VALVE HAVING A CAP NUT COUPLER

BACKGROUND OF THE INVENTION

1. Field of the Invention

This invention relates to a plastic valve, or a valve made of a synthetic resin. Specifically, it pertains to a plastic valve of the type in which a body and a flanged body cap are connected by screwing with a cap nut.

2. Description of the Prior Art

In FIG. 1, which illustrates a conventional plastic valve of the type in which a body and a flanged body cap are coupled by a cap nut, the reference numeral 1 represents a body; 2, a handle; 3, a ball; 4, a union; 5, a body cap; 5a, an annular seat of the body cap 5; 6, a cap nut; 6a, an annular holding bottom of the cap nut 6; 7, a flange; and 8, a welded or screwed part of the flange 7. In coupling the body cap 5 to the body 1, the body cap 5 is inserted into the cap nut 6 and then the cap nut 6 is screwed to the body 1. As a result, the holding bottom 6a of the cap nut 6 causes the seat 5a of the body cap 5 to be press-bonded to the union 4 thereby achieving intimate coupling between the body and the body cap.

In such a conventional valve, it is necessary, before securing the flange 7 to the body cap 5, to put the cap nut 6 around the body cap 5 from the flange-securing side of the body cap 5 and then to weld or screw the flange 7 to the body cap 5. For this reason, the flange and the body cap cannot be built as an integral unit, with the result that the strength of the flange-securing portion of the body cap is reduced and cracks tend to form at this portion. Moreover, the number of valve assembling steps naturally increases.

The present invention has been made in order to remove the aforesaid defects of conventional valves. It is therefore an object of this invention to provide a plastic valve which can be built by a lesser number of assembling steps than in the case of conventional valves of this type, and can be disassembled more easily than the conventional valves.

Another object of this invention is to provide a plastic valve which has higher strength than the conventional valves of this type because its flange portion and body cap can be molded as an integral unit.

SUMMARY OF THE INVENTION

In the valve of this invention, the body cap consists of (1) a tubular first element having a flange at one end, a disengagement-preventing portion formed at the other end to be connected to the body, and an annular groove formed inwardly of, and adjacent to, the disengagement-preventing portion and (2) a ring-like second element having a small-diameter portion adapted to be fitted into the annular groove of the first element, a large-diameter portion adapted to contact the outer surface of the disengagement-preventing portion of the first element, and a rear wall adapted to stand upright diametrically outwardly from the outside wall of the first element when the second element is coupled to the first element, the second element being cut at one site in its circumferential direction to form two cut ends. The first element is coupled to the second element by putting a cap nut around the first element, temporarily deforming the ring-like second element, and putting the deformed second element around the first element to fit the small-diameter portion of the second element into the annular groove of the first element and position the large-diameter portion of the second element on the disengagement-preventing portion of the first element, whereby the second element forms a seat of the body cap.

In a preferred embodiment of the valve of this invention, the first element is coupled to the second element by temporarily enlarging the second element in the diametrical direction and putting the deformed second element around the first element such that the small-diameter portion moves past the disengagement-preventing portion and fits into the annular groove of the first element.

In another preferred embodiment of the valve in accordance with this invention, a recess is provided in the disengagement-preventing portion of the first element obliquely to the axial direction of the first element, and the first element is coupled to the second element by temporarily deforming one cut end portion of the second element in the axial direction with respect to the other cut end, inserting the one cut end through the oblique recess of the first element, and rotating the second element relative to the first element.

BRIEF DESCRIPTION OF THE DRAWINGS

Specific embodiments of the invention are described with reference to the drawings in which.

DETAILED DESCRIPTION OF THE PREFERRED EMBODIMENT

Figure 1:
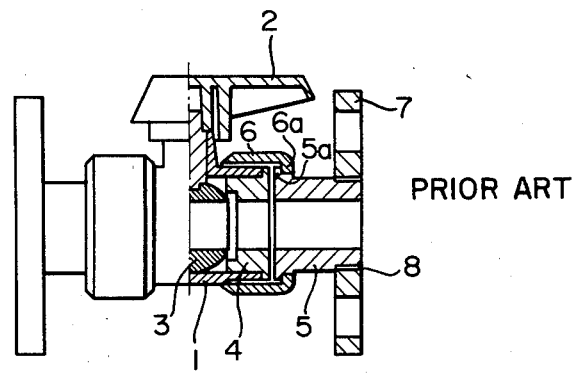
FIG. 1 is a partially sectional view showing a conventional example of a plastic valve.
Figure 2:
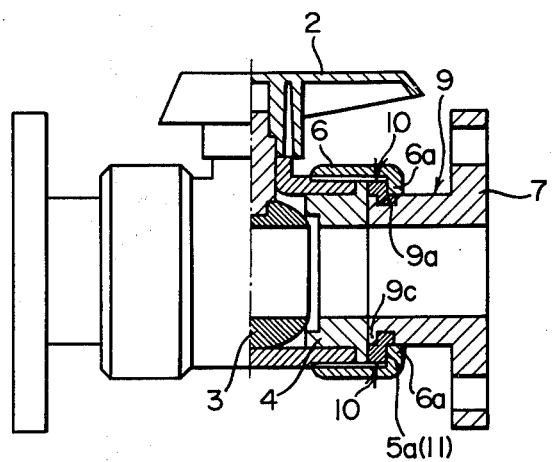
FIG. 2 is a partially sectional view showing one embodiment of the plastic valve in accordance with this invention.
Figure 3:
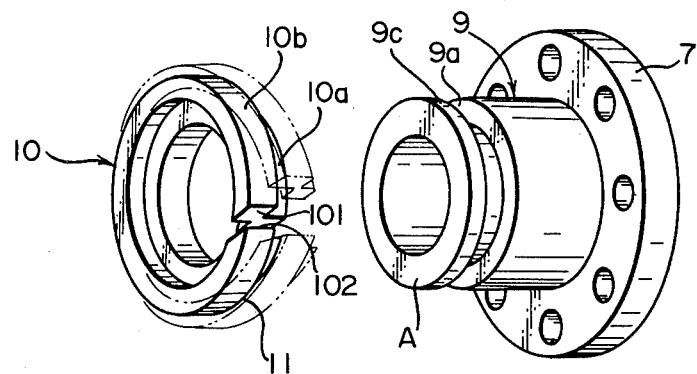
FIG. 3 is a perspective view showing constituent members in the plastic valve shown in FIG. 2.

In FIGS. 2 and 3 in which like numerals represent similar elements in FIG. 1, a first element 9 constituting the body cap has a flange 7 formed integrally at its one end portion. The first element 9 also has formed an annular groove 9a of a predetermined width and depth circumferentially at the other end portion thereof spaced from an end surface A by a predetermined distance in the axial direction. A portion 9c which lies between the end surface A and the annular groove 9a is referred to herein as a disengagement-preventing portion.

A second element to be coupled to the first element 9 to form a body cap is shown at 10. It is a one-piece element consisting of a small-diameter portion 10a adapted to be fitted into the annular groove 9a and a large-diameter portion 10b surrounding a part or the whole of the small-diameter portion 10a and adapted to contact the peripheral surface of the disengagement-preventing portion 9c. The second element is cut at one site in the circumferential direction, to form two cut ends 101 and 102.

The second element 10 further has a rear wall 11 which stands upright diametrically outwardly from the outside wall of the first element when the second element 10 is coupled with the first element 9. Preferably, the inside diameter of the small-diameter portion 10a is substantially equal to the outside diameter of the annular groove 9a of the first element 9, and the width of the small-diameter portion 10a is substantially equal to that of the annular groove 9a. It is necessary on the other hand that the outside diameter of the large-diameter portion 10b should not be larger than the inside diameter of the cap nut 6. Desirably, when the second element is coupled to the first element, the coupling end surface of the large-diameter portion 10b is on the same plane as the coupling end surface A of the first element.

The ring-like second element 10 is coupled to the first element after putting the cap nut 6 around the first element 9 from the end surface A. Coupling is effected by applying to the second element 10 a force tending to move the two cut ends 101 and 102 of the second element 10 away from each other, thereby temporarily enlarging the diameter of the second element 10 (the enlarged state is shown by a dotted line in FIG. 3), and then fitting the small-diameter portion 10a into the annular groove 9a of the first element by putting it over the first element beyond the disengagement-preventing portion 9c. Upon the fitting of the small-diameter portion 10a into the annular groove 9a, the inner surface of the large-diameter portion 10b contacts the outside surface of the disengagement-preventing portion 9c, whereby the first element is coupled to the second element to form a body cap and a seat 5a of the body cap is formed by the rear wall 11 of the second element.

The threaded inner surface of the cap nut 6 is screwed to the threaded outside surface of the body and the cap nut 6 is advanced toward the body 1 until the holding bottom 6a of the cap nut 6 abuts the seat 5a of the body cap, whereby the body is closely coupled to the body cap.

Figure 4:
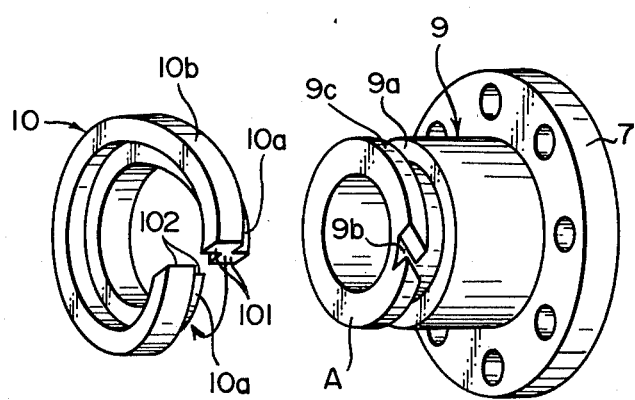
FIG. 4 is a perspective view showing constituent members in another embodiment of the plastic valve of the invention.

Another specific embodiment of the body cap in accordance with this invention is shown in FIG. 4. In FIG. 4, the second element 10 is shown in the temporarily deformed state which it assumes immediately before coupling to the first element 9.

The first element constituting the body cap in FIG. 4 is the same as the first element in FIG. 3 except that a recess 9b inclined to the axis of the first element is formed in the disengagement-preventing portion 9c. The recess 9b is formed such that it communicates with the annular groove 9a, and the bottom surface of the recess 9b is on the same level as the bottom surface of the annular groove 9a. The second element 10 in FIG. 4 is cut at one site in the circumferential direction as in FIG. 3 to form cut ends 101 and 102. The second element is coupled to the first element by temporarily deforming the second element 10 so that the cut end 101 axially moves away from the cut end 102 as shown in FIG. 4, inserting the cut end 101 through the recess 9b of the first element from the end surface A, and then rotating the second element 10 in a direction shown by an arrow in FIG. 4. As a result, the small-diameter portion 10a of the second element is fitted into the annular groove 9a of the first element, and the inner surface of the large-diameter portion 10b of the second element contacts the outside surface of the disengagement-preventing portion 9 of the first element, whereby a seat 5a of the body cap is formed in the same way as in FIG. 3.

The method of coupling the body caps shown in FIGS. 2 and 3 is the same as described with regard to FIG. 1.

The synthetic resin which constitutes the valve of this invention may, for example, include vinyl chloride resins, chlorinated vinyl chloride resins, polypropylene, and fluorocarbon resins, the vinyl chloride resins being especially preferred.

Since the body cap in the valve of this invention is constructed of the first and second elements and the two elements are coupled to each other after putting a cap nut around the first element from that end of the first element which is to be connected to the body, the body cap and the flange can be molded as an integral one-piece unit. Accordingly, higher strength can be obtained than in a conventional valve in which the flange is welded or screwed to the body cap. Furthermore, the valve in accordance with this invention can be built by a lesser number of assembling steps than in the conventional valves. Moreover, the first and second elements may be easily separated from each other as required, and the cap nut can be easily detached. Consequently, the valve of the invention permits easy part replacement or repair as required.

What we claim is:

1. In a valve formed of synthetic resinous material including a body having an end surface and a peripheral surface and a cylindrical body cap having a flange portion at one end and a seat at the other end, the body cap being coupled to the body by screwing a cap nut, movably surrounding the peripheral surface of the body cap, to engage the seat and the peripheral surface of the body and hold the body to the body cap at the end surface of the body, the improvement wherein:

the body cap includes a cylindrical element having a cylindrical disengagement-preventing end portion at the other end of the body cap having a free front end face formed in a first plane facing the end surface of the body, the body cap having an annular groove adjacent said disengagement-preventing end portion;

the body cap further comprising a ring-like element including a small diameter portion fittable into said groove, said small diameter portion having a first cylindrical inner surface having a first inner diameter; said ring-like element further comprising a large diameter portion having a second cylindrical inner surface having a second inner diameter greater than said first inner diameter and a radially extending front end surface, said ring-like element having such dimensions that when said small diameter portion is fitted in said annular groove, said second cylindrical inner surface contacts the outer peripheral surface of said disengagement-preventing end portion and said radially extending front end surface lies in said first plane; said ring-like element having a cut defining two separable confronting surfaces, whereby said ring-like element is deformable around said cylindrical element to fit said small diameter portion into said annular groove and position said large diameter portion on said disengagement-preventing end portion; said ring-like element further having a rear wall forming the seat extending radially outwardly of the peripheral surface of said disengagement-preventing element and facing the one end of the body cap.

2. In a valve as in claim 1, wherein said ring-like element is deformable in a radial direction whereby said small diameter portion is movable across the peripheral surface of said disengagement-preventing end portion into said annular groove.

3. In a valve as in claim 1, wherein said disengagement-preventing end portion has a recess extending from said front end surface into said annular groove obliquely to the axis of said disengagement-preventing end portion, so that said small diameter portion of said ring-like element is extendable, one of said two confronting surfaces first, through said recess into said annular groove and rotatable in said annular groove around the cylindrical body cap to fit said small diameter portion into said annular groove.

4. In a valve as in claim 1, wherein the cap nut comprises means for engaging said rear wall to move and hold said front end surface and said free front end face of said disengagement-preventing portion against the end surface of the body.

5. In a valve as in claim 1, wherein said flanged portion is integral with said cylindrical element.

6. In a valve formed of synthetic resinous material including a body having an end surface and a peripheral surface and a cylindrical body cap having a flanged portion at one end and a seat at the other end, the body cap being coupled to the body by screwing a cap nut, movably surrounding the peripheral surface of the body cap, to engage the seat and the peripheral surface of the body and hold the body to the body cap at the end surface of the body, the improvement wherein:

the body cap includes a cylindrical element having a cylindrical disengagement-preventing end portion at the other end of the body cap having a free front end face facing the end surface of the body, the body cap having an annular groove adjacent said disengagement-preventing end portion;

the body cap further comprising a ring-like element including a small diameter portion fittable into said groove, said small diameter portion having a first cylindrical inner surface having a first inner diameter; said ring-like element further comprising a large diameter portion, having a second cylindrical inner surface having a second inner diameter which contacts the outer peripheral surface of said disengagement-preventing end portion when said small diameter portion is fitted in said annular groove; said ring-like element further having a rear wall forming the seat extending radially outward of the peripheral surface of said cylindrical element and facing said one end of the body cap;

said disengagement-preventing end portion having a recess extending from said front end surface into said annular groove obliquely to the axis of said disengagement-preventing end portion; said ring-like element having a cut defining two separable confronting surfaces whereby said ring-like element is deformable so that said small diameter portion of said ring-like element is extendable, one of said two confronting surfaces first, through said recess of said disengagement-preventing end portion into said annular groove and rotatable in said annular groove around said body cap to fit said small diameter portion into said annular groove.

* * * * *